G. B. HAMLIN.
Vehicle-Spring.
No. 219,087.  Patented Sept. 2, 1879.
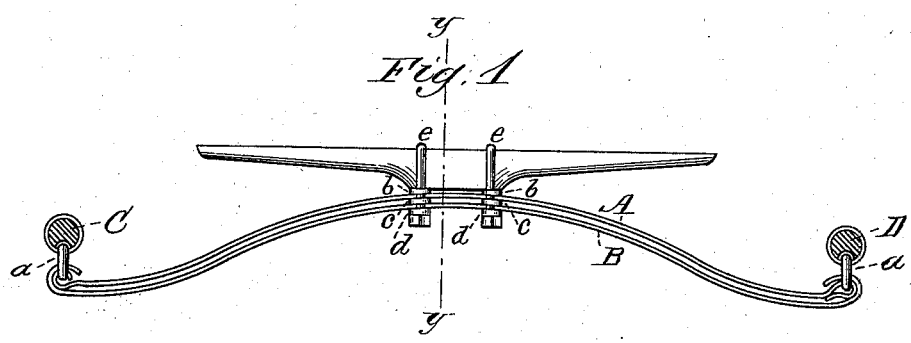
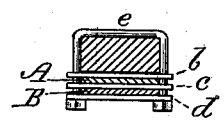
Witnesses
Nat. E. Oliphant
Geo. R. Porter
Inventor
George B. Hamlin,
per Chas. H. Fowler,
Attorney.

UNITED STATES PATENT OFFICE.

GEORGE B. HAMLIN, OF WILLIMANTIC, CONNECTICUT.

IMPROVEMENT IN VEHICLE-SPRINGS.

Specification forming part of Letters Patent No. 219,087, dated September 2, 1879; application filed July 24, 1879.

*To all whom it may concern:*

Be it known that I, GEORGE B. HAMLIN, of Willimantic, in the county of Windham and State of Connecticut, have invented a new and valuable Improvement in Vehicle-Springs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention, and Fig. 2 is a cross-section taken on line $y$ $y$ of Fig. 1.

This invention has relation to that class of vehicle-springs known as "side-bar" springs; and the object thereof is to construct the spring and connect it to the side bars of the vehicle in such a manner that the friction is greatly reduced, and the spring allowed to lengthen without strain on the side bar, as will be hereinafter described, and subsequently pointed out in the claims.

In the accompanying drawings, A B represent two or more leaves of a spring running parallel with each other their entire length. These steel plates or leaves A B are connected at their ends to swinging shackles $a$, said shackles being suitably connected to the side bars C D. (Represented in cross-section, Fig. 1 of the drawings.)

The ends of the leaves A B, connected, as above described, to the side bars, C D, and bent around the shackles, as illustrated in the drawings, admit of one leaf sliding inside of the other, serving to lessen the friction to a considerable degree, the swinging shackles allowing the spring to lengthen without strain on the side bars.

The leaves A B, near or at their center, rest upon yokes $b$ $c$ $d$, said yokes being connected together by clips or bolts $e$. By this manner of arranging the yokes between and upon each side of the leaves of the spring the center of the spring is not confined as in the old way, but will spring the whole length, thereby giving it greater working length than is secured in the ordinary side-bar spring.

A further advantage obtained in the employment of the yokes is that the elasticity of the spring is greatly increased, as the leaves will spring as readily between the yokes as elsewhere, whereas if one leaf rested upon the other, and yokes were used only upon the top and bottom of the spring, the pressure necessary to hold it to the wagon or vehicle body, the friction of one leaf upon the other would be so great that little or no elasticity would be secured between or near the yokes.

Having now fully described my invention, what I claim as new, and desire to secure by Letters Patent, is—

1. The side-bar spring consisting of two or more leaves, A B, running parallel with each other their entire length, and connected to swinging shackles upon the side bars of the vehicle, substantially as and for the purpose set forth.

2. The vehicle-spring consisting of the leaves A B, and the yokes $b$ $c$ $d$ between and upon each side of the leaves, substantially as and for the purpose specified.

3. The spring consisting of the leaves A B, connected at their ends to swinging shackles, and having yokes $b$ $c$ $d$ between and upon each side of the leaves, substantially as and for the purpose specified.

In testimony that I claim the above I have hereunto subscribed my name in the presence of two witnesses.

GEORGE B. HAMLIN.

Witnesses:
ROBERT FENTON,
HUBER CLARK.